(12) United States Patent
McDonald et al.

(10) Patent No.: US 7,322,458 B1
(45) Date of Patent: Jan. 29, 2008

(54) ORIENTING AND FEEDING APPARATUS FOR MANUFACTURING LINE

(75) Inventors: Walter McDonald, Newton, NJ (US); Norbert J. Seitel, Gillette, NJ (US)

(73) Assignee: Norwalt Design Inc., Randolph, NJ (US)

( * ) Notice: Subject to any disclaimer, the term of this patent is extended or adjusted under 35 U.S.C. 154(b) by 29 days.

(21) Appl. No.: 11/498,328

(22) Filed: Aug. 2, 2006

(51) Int. Cl.
*B65G 47/24* (2006.01)
(52) U.S. Cl. ...................... 198/389; 198/817
(58) Field of Classification Search ............. 198/389, 198/390, 393, 396, 397.01, 413, 415, 817; 221/165
See application file for complete search history.

(56) References Cited

U.S. PATENT DOCUMENTS

| | | | | |
|---|---|---|---|---|
| 2,252,498 A * | 8/1941 | Flaws, Jr. | ................... | 198/389 |
| 3,365,048 A * | 1/1968 | Ehrlich et al. | .............. | 198/390 |
| 3,965,523 A * | 6/1976 | Elliott | ......................... | 198/817 |
| 4,244,459 A * | 1/1981 | Garrett | ........................ | 198/389 |
| 4,274,529 A * | 6/1981 | Mori et al. | .................. | 198/817 |
| 4,550,820 A * | 11/1985 | Bishop | ........................ | 198/389 |
| 4,610,345 A * | 9/1986 | Spreen et al. | ................ | 198/392 |
| 5,186,307 A * | 2/1993 | Doudement et al. | ......... | 198/454 |
| 5,396,979 A * | 3/1995 | Wysocki | ...................... | 198/392 |
| 5,780,069 A * | 7/1998 | Suzuki | .................... | 425/174.4 |
| 6,575,305 B1 * | 6/2003 | Casagrande | ................. | 198/455 |

* cited by examiner

Primary Examiner—James R. Bidwell
(74) Attorney, Agent, or Firm—Klauber & Jackson L.L.C.

(57) ABSTRACT

Apparatus for orienting and feeding blow molded preforms which are elongated generally cylindrical plastic objects, one end of which is a threaded neck portion for the ultimate blow molded container, and the other end of which extends from the opposed end of the cylindrical object as a narrower and heavier tubular portion which during the blow molding operation will be softened and enlarged into the ultimate container, the preform further including an encircling handling disc between the said threaded neck portion and tubular portion which has a larger diameter than the remaining portions of the preform, the disc serving to facilitate handling of the preforms. First and second conveying belts are provided having input and output ends for cooperatively conveying such objects toward a downstream processing line. The belts are mounted so that their respective conveying surfaces are movable in a common parallel direction. The facing edges of the conveying surfaces of these belts are spaced from one another to define a uniform gap between them of a dimension less than that of the disc. The conveying surfaces are upwardly sloped away from the gap, to define a zone converging downwardly in the direction of the gap. Object input means deposit the initially unoriented preforms at the input ends of the conveying belts. The belts are moved in a common direction, but at different speeds. The preforms are rotated by contact with the differentially speeding belts as they descend into the converging zone and become supported at the gap and conveyed by riding on the edges of the moving belts which border the gap. Object output means at the ends of the belts receive the oriented objects and direct them toward the downstream processing line. Means at the output ends of the belts deflect any preforms which are not properly oriented and seated in the gap; and preform output means at the output end of the belts receive the oriented preforms and direct them toward the processing line. In order to preclude or minimize the preforms resisting deflection due to frictional lock between the disc portion of the preform and an adjacent lateral edge of an opposed belt, one or both of the lateral edges of the belts abounding the gap are formed to diverge upwardly away from the belt gap.

11 Claims, 7 Drawing Sheets

ORIENTING AND FEEDING APPARATUS FOR MANUFACTURING LINE

FIELD OF INVENTION

This invention relates generally to apparatus which are useful in orienting and feeding large numbers of successive objects from a supply source to a downstream processing station. More specifically the invention relates to such apparatus which are particularly applicable in the orienting and feeding of generally cylindrical, substantially identical elongated objects.

BACKGROUND OF THE INVENTION

In the course of manufacturing or assembling various manufactured goods it is often desirable to orient and feed components or precursors of the goods from a supply source to a downstream processing station at which the components or precursors may be further processed or assembled with other components. Typical manufacturing operations to which the invention is applicable are blow molding operations and trimming operations. At one point e.g., in the manufacture of mass produced blow molded objects such as plastic containers for beverages or other liquids, so called "preforms" are fed from a container or hopper to a downstream station or stations where the actual blow molding operations will occur. In order to carry out this operation in a rapid and accurate fashion it is necessary to order these preforms into a single line of successive units, all of which are appropriately and identically oriented, and which are then directed in single file rapidly moving fashion to the further station(s) such as those of a blow molding operation. Basically therefore one starts with a collection of preforms in a large hopper or container and processes these through an orienting and feeding station as to end up with an output flow of single file preforms, all properly oriented for further processing at downstream stations.

An example of a well known blow molding preform to which the invention is applicable, is an elongated generally cylindrical plastic preform, one end of which is a threaded neck portion for the ultimate blow molded container, and the other end of which extends from the opposed end of the cylindrical object as a narrower and heavier tubular portion which during the blow molding operation will be softened and enlarged into the ultimate container. Such preform further includes an encircling handling disc between the threaded neck portion and tubular portion which has a larger diameter than the remaining portions of the preform, the disc serving to facilitate handling of the preforms.

In the past it has proved very difficult to orient and feed elongated objects of the foregoing types in rapid fashion. Many prior art devices have relied upon complex rotating tables and the like having deflecting surfaces which orient the objects as they spin and centrifugally move on the table to which they are fed, so as to enable the objects to exit from a peripheral point of the table properly oriented. These devices are unfortunately not capable of rapid and accurate processing of the objects. Accordingly a need exists for apparatus which are capable of orienting and accurately and rapidly feeding such elongated objects in the manner of interest to the manufacturer.

In our abandoned U.S. patent application Ser. No. 10/353,638, filed Jan. 29, 2003, and published on Jan. 29, 2004 under US-2004-0144618-A1, we disclosed apparatus and methods for rapidly orienting and feeding generally cylindrical, substantially identical elongated objects which are broadly characterized by having a maximum transverse diameter Y. In accordance with that invention first and second continuous conveying belts are provided having input and output ends for cooperatively conveying such objects toward a downstream processing line. The belts are mounted so that their respective conveying surfaces are movable in a common parallel direction. The facing edges of the conveying surfaces of these belts are spaced from one another to define a uniform gap between them of a dimension less than Y. The conveying surfaces reside and are movable in planes which are upwardly sloped away from the gap. The surfaces thereby define a zone converging downwardly in the direction of the gap. Object input means are provided for depositing the then unoriented elongated objects at the input ends of the conveying belts and object output means at the distal ends of the belts receive the objects, which are then oriented, and direct them toward the downstream processing line. In accordance with the orienting feature of that earlier invention means are provided for moving the belts in a common direction, but at different respective speeds. In consequence the unoriented elongated objects deposited at the input ends of the belts are rotated by contact with the differentially speeding belts as the objects descend into the converging zone and become supported at the gap and conveyed by riding on the edges of the moving belts which border the gap. The objects as they descend become oriented in positions of gravitationally maximum stability relative to the mode of support, these positions being commonly characteristic for the particular objects.

The said objects are typically fed to the input ends of the belts from a supply hopper or other container via a supply belt on which the objects are deposited as substantially a single layer of randomly oriented objects for feeding to the moving conveying belts as a collection of mutually spaced such objects. The conveying belts are preferably flattened closed loops, the conveying surfaces of which are defined at the uppermost sides of the loops. The conveying belts are preferably moved at a differential speed in the range of 110% to 180% (i.e., one belt moves at a speed which is 1.1. to 1.8 times faster than the other). The difference in speed is more generally such in relation to the path length for conveyance that the objects can be rotated as they descend in the converging zone to the desired new stable positions. The apparatus and method may include features for removing objects at the output ends of the conveying belts which have not properly descended in the converging zone to achieve the desired stable support positions at the gap. These misoriented objects are recycled to an upstream point for further treatment in accordance with the invention.

The prior art invention is diagrammatically illustrated in FIGS. 1 and 2 in which FIG. 1 is a perspective view of such apparatus and FIG. 2 is an end view of the apparatus. The apparatus 10 shown is particularly useful for orienting and feeding preforms of the type that has been previously discussed. These preforms are intended for orienting and feeding to a downstream processing point where they will be subjected to a blow molding process in order to produce a container of the type commonly used for various liquids such as large plastic beverage containers and the like. These preforms 12 are fed from an input bin (not shown) via a supply input belt 14. The representative preform 12 is a moldable plastic product which is well known. It is a unitary structure having an enlarged threaded portion 16 from which extends a tubular portion 18 which is of reduced diameter and which is heavier than the portion 16. As has previously been discussed the threaded portion 16 will ultimately form the neck of the blow-molded container, whereas the tubular portion 18 will form the hollow body of the container. The preform 12 is seen to be generally cylindrical and its largest transverse diameter is defined at portion 16.

The preforms 12 are next deposited upon a feed input belt 20, which is operated by a motor 22 which actuates a timing belt 24 for belt 20. A guard 26 surrounds the timing belt. Preforms 12 are deposited upon the surface 25 of input belt 20 substantially as a single layer so that they become relatively spread out as separated objects as they proceed to the remainder of apparatus 10. One of the guide walls 21 bordering belt 20 has been partially broken away to better show this. As seen in FIGS. 1 and 2 the preforms 12 descend down a chute 28 whereupon they reach the feed orienting and conveying belts 30. In the embodiment shown in FIGS. 1 and 2 the conveying belts 30 comprise a first belt 32 and a second belt 34. The latter can comprise a single wide belt, but in this embodiment actually comprises two commonly driven sub-belts 36 and 38.

Belts 32 and 34 are driven by separate motors and gearing arrangements, one such motor and gear box being shown at 40. The speed of these motors is separately controlled with the objective that the belts 32 and 34 are driven at different speeds. The preferable differential speed is in the range of approximately 110 to 180 percent. The belt 34 as mentioned consists of two sub-belts 36 and 38 in order to give it a greater width. This is necessary since the objects being fed from chute 28 proceed from the outer side of belt 34, which preferably has a sufficient width at its upwardly facing conveying surface to accommodate the approximate length of the elongated objects even when crosswise, thereby preventing the objects from falling off. The opposed first belt 32 is provided with a guard edge 33 (shown in FIG. 2 and partially in FIG. 1) to prevent the preforms from inadvertently falling from that side of the moving belts 30.

A basic feature of the prior art invention as seen in FIGS. 1 and 2 is that the belts 32 and 34 have their conveying surfaces 35 and 37 in planes which are sloped upwardly away from the space or gap 42 which is defined between the adjacent edges of the parallel moving belts. These sloping surfaces provided by the belts therefore define a converging zone 43 wherein the preforms 12 gravitationally descend toward the gap 42. The angle of convergence for this zone is generally in the range of 90° to 120°, but may vary depending upon the objects being oriented, and other factors such as the rates of belt advance. The two surfaces bounding the zone of convergence need not have an identical slope angle with respect to the gap. The preforms 12 are objects which are generally cylindrical and have a maximum diameter Y defined by the threaded neck portion 16. The gap 42 between the belts 32 and 34 is of a dimension which is less than Y but greater than the smallest transverse diameter of tubular portion 18 of preforms 12. Gap 42 can be varied by an adjusting screw 45. Because of the differential speed of movement of the conveying surfaces of the belts 32 and 34 the preforms 12 as they descend in converging zone 43 are rotated by contact with the belts on each side of the object, and as they drop toward and into gap 42 they achieve their characteristically gravitationally most stable position. In this case that position is one wherein the heavier tubular portion 18 slides downward into and through the gap 42 and wherein the enlarged neck portion 16 rides upon the adjacent edges of the two conveying surfaces 35 and 37. The preforms 12 are therefore now properly oriented and continue downstream.

A deflecting surface 44 is provided at the output ends of the belts 30 to deflect any preforms which are not properly oriented and seated in the gap 42, so that these deflected objects proceed to the right in the sense of FIG. 1 onto a recycle conveyer 46, which feeds these recycled objects back to the belts 30 at an upstream point via return chute 48.

From the output end of the apparatus 10 the now oriented preforms 12 proceed via an output chute or channel 50 where they are advanced to a further station as for example the aforementioned blow molding station (or associated stations) at which heating and blow molding of the preforms 12 may occur.

The prior art apparatus discussed, while being generally effective in its use, was found by the inventors to be commercially unacceptable in that during operation preforms which did not descend properly into the gap between the conveying belts and become correctly seated therein, would frequently become impossible to deflect from the conveyed stream at the output end thereof and would thereby impair the apparatus operation. Lengthy investigation revealed that what was happening, as illustrated in the schematic of FIGS. 3 and 3A, was that the preform 60 shown there was becoming frictionally locked due to the edge 62 of disc 64 effectively locking with the lateral edge 66 of the adjacent belt 37. Thus a solution was sought which is the subject of the present invention.

SUMMARY OF INVENTION

Now in accordance with the present invention an improvement is provided in prior art apparatus for orienting and feeding blow molded preforms which are elongated generally cylindrical plastic objects, one end of which is a threaded neck portion for the ultimate blow molded container, and the other end of which extends from the opposed end of the cylindrical object as a narrower and heavier tubular portion which during the blow molding operation will be softened and enlarged into the ultimate container, the preform further including an encircling handling disc between the said threaded neck portion and tubular portion which has a larger diameter than the remaining portions of the preform, the disc serving to facilitate handling of the preforms. First and second conveying belts are provided in such apparatus having input and output ends for cooperatively conveying such objects toward a downstream processing line. The belts are mounted so that their respective conveying surfaces are movable in a common parallel direction. The facing edges of the conveying surfaces of these belts are spaced from one another to define a uniform gap between them of a dimension less than that of the disc. The conveying surfaces are upwardly sloped away from the gap, to define a zone converging downwardly in the direction of the gap. Object input means deposit the initially unoriented preforms at the input ends of the conveying belts. The belts are moved in a common direction, but at different speeds. The preforms are rotated by contact with the differentially speeding belts as they descend into the converging zone and become supported at the gap and conveyed by riding on the edges of the moving belts which border the gap. Object output means at the ends of the belts receive the oriented objects and direct them toward the downstream processing line. Means at the output ends of the belts deflect any preforms which are not properly oriented and seated in the gap; and preform output means at the output end of the belts receive the oriented preforms and direct them toward the processing line.

In accordance with the improvement and in order to preclude or minimize the preforms resisting deflection due to frictional lock between the disc portion of the preform and an adjacent lateral edge of an opposed belt, one or both of the lateral edges of the belts abounding the gap are formed to diverge upwardly away from the belt gap. The deflection means at the output of the apparatus preferably comprises a blow-out device, but can comprise other means such as a mechanical hook, arm, or surface, and at least the lateral edge of the conveying belt which is at the side of the deflection is provided with the said diverging form of surface. The diverging edge of the belt can be a simple linear sloped surface or can be a smoothly curved or other divergent surface.

In a further aspect of the present invention vertical side walls are mounted to extend downwardly at each side of said gap, to stabilize the seated preforms as they are conveyed by the moving belts. It will be understood that as used herein the term "belts" is meant to encompass both flexible cloth-like materials, as well as the preferably used hard link-type chain, the links of which comprise a hard plastic or metallic material.

The differential in speed of the conveying belts is preferably in the range of 110 to 180% for high-speed operation. 140 to 160% differential is an even more preferable speed differential.

BRIEF DESCRIPTION OF DRAWINGS

The invention is diagrammatically illustrated, by way of example in the drawings appended hereto, in which:

FIG. 3A is an enlargement of the portions of FIG. 3 which are most pertinent to the locking action;

FIG. 5A is an enlargement of the portions of FIG. 5 which are most pertinent to the improvement shown in FIG. 5;

DESCRIPTION OF PREFERRED EMBODIMENTS

Figures 4, 4A, 4B:
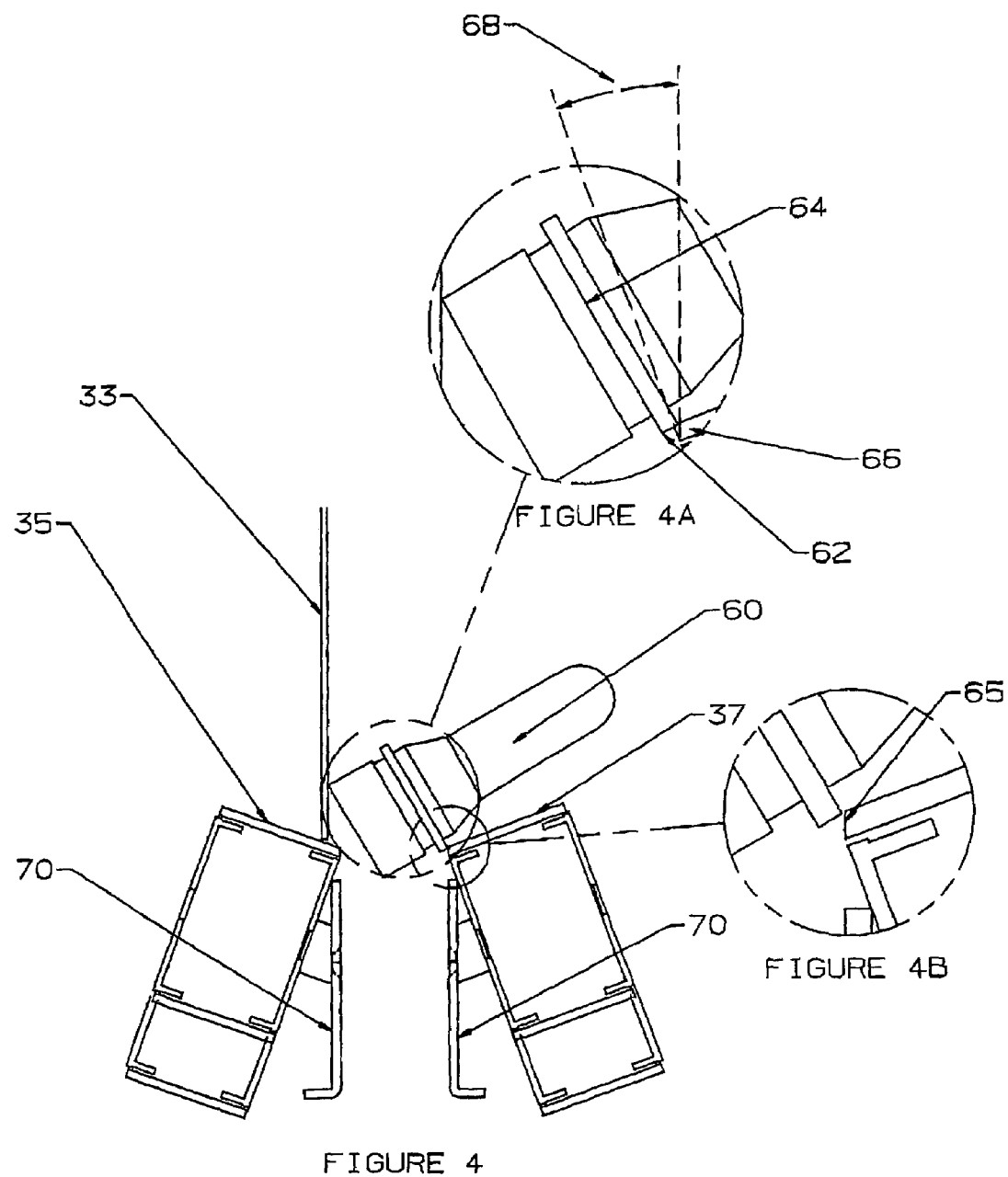
FIG. 4 is a view similar to FIG. 3, but depicting the improved structural features of the present invention which serve to overcome the frictional locking effect.
FIGS. 4A and 4B are enlargements of the portions of FIG. 4 which are most pertinent to the improvements of the invention.

As seen in FIGS. 4, 4A, and 4B the handling disc 64 during deflection by blow-out or other means impinges against a lateral edge of belt 37 which has been modified to the form of a linearly sloping surface 65 which diverges in an upward direction to preclude or minimize any frictional locking as might otherwise occur as the preform 60 is displaced upwardly and to the right in the sense of the Figures. The angle 68 of the slope with respect to a perpendicular to the belt 37 can typically be such as shown, i.e. as to bring the sloped surface into a substantially vertical plane, The lateral edge of the opposed belt 35 can be sloped in a similar manner to minimize possible lock at that edge; however the more important modification is at belt 37 which is assumed in the Figure to be the direction in which the improperly seated preform 60 is being deflected.

A further advantageous modification of the prior art apparatus is the addition of downwardly extending guide walls 70. These extend downwardly in the gap between the belts and serve to guide and stabilize the advancing preforms which have properly seated in the gap.

Figure 5:
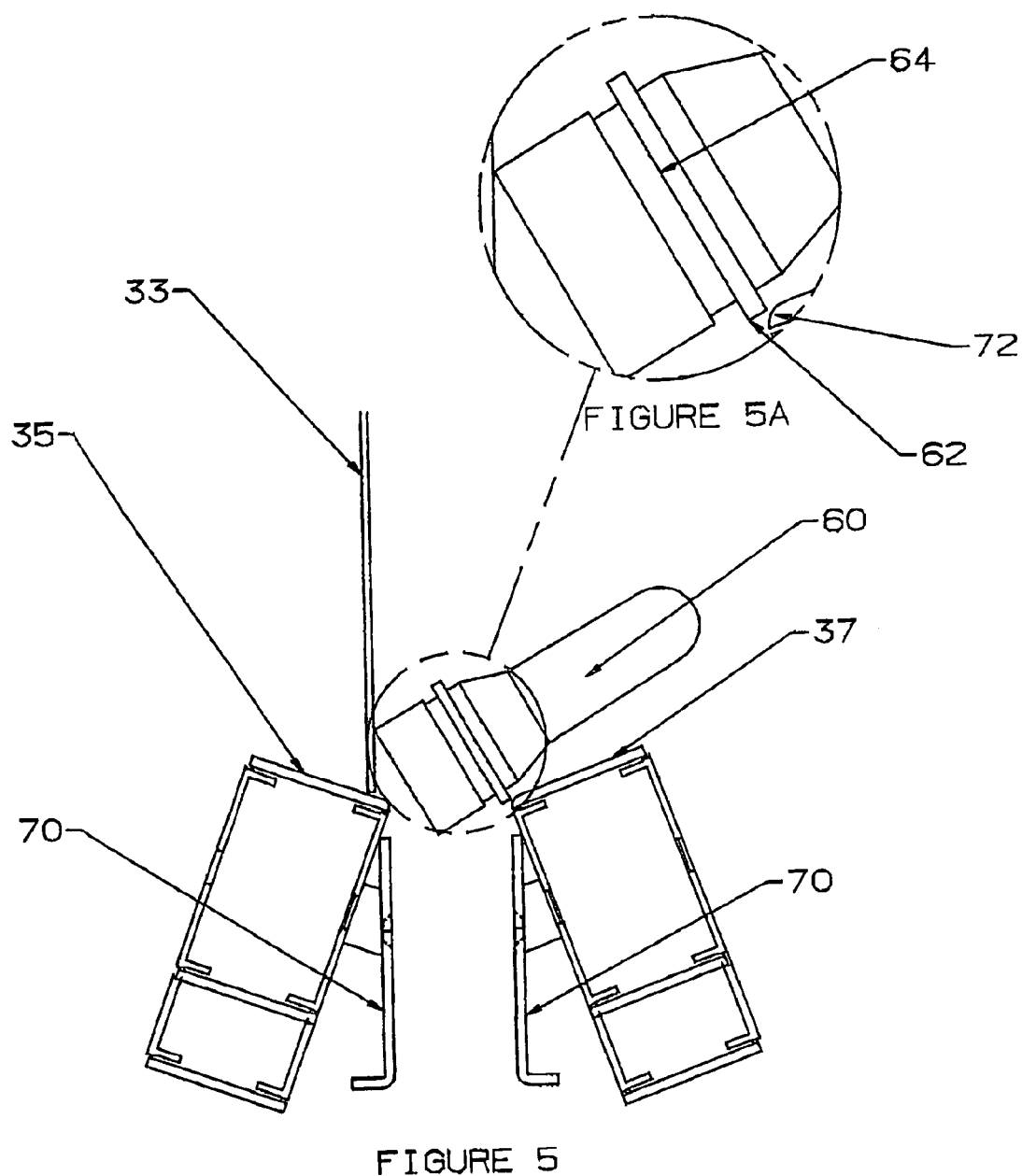
FIG. 5 is a view similar to FIG. 4, but showing a further embodiment of the present invention.

FIGS. 5 and 5A are similar to FIGS. 4 and 4A, except that the lateral edge of belt 37, instead of being uniformly sloped, is formed into a smoothly upwardly diverging curved surface 72. This arrangement provides a corresponding function to the sloped surface of the prior embodiment. As in that prior embodiment the lateral edge of belt 35 can be similarly formed, and combinations of divergent surfaces at the lateral edges of the belts abounding the gap can also be used.

Figure 1:
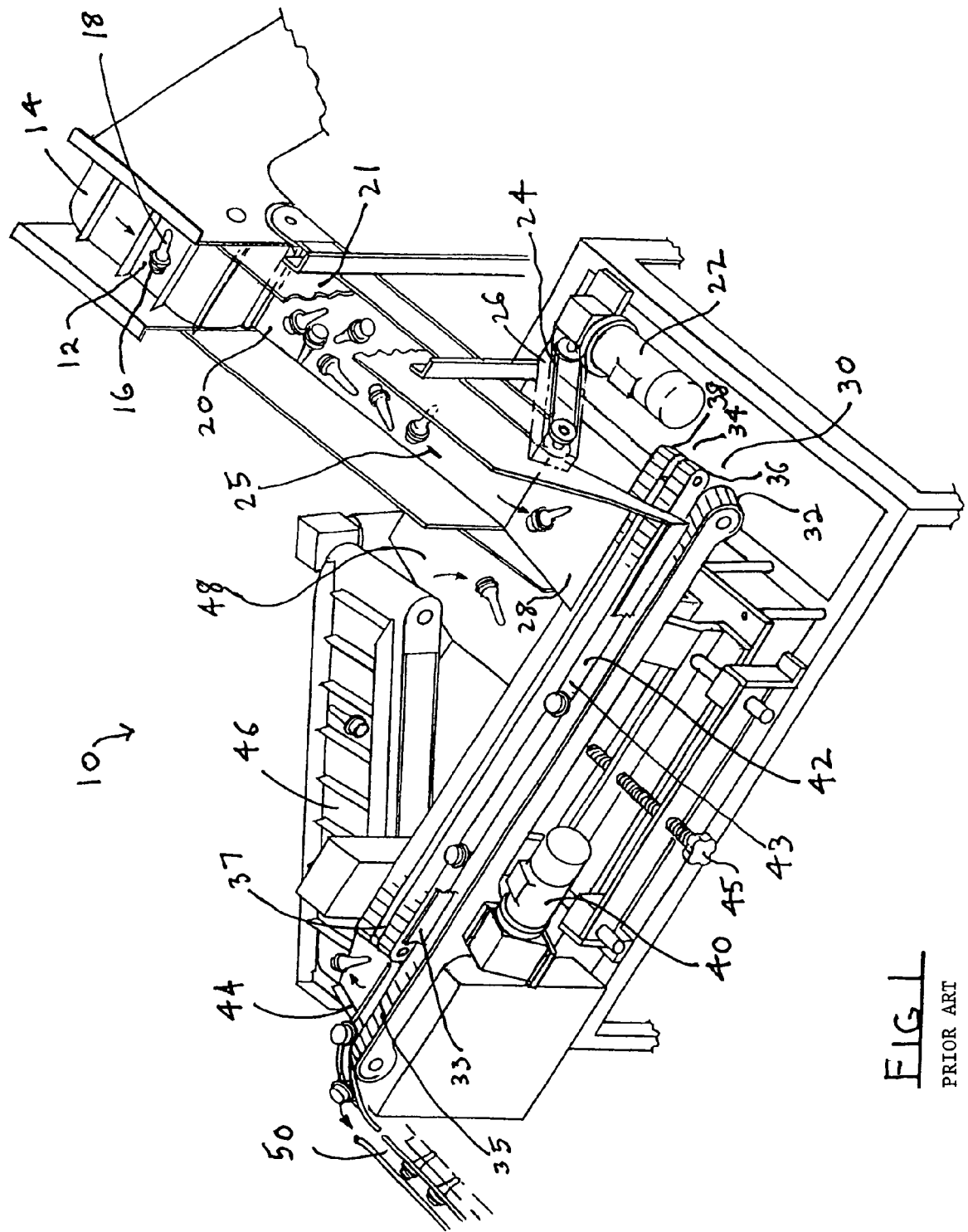
FIG. 1 is a perspective view of the inventors' prior art apparatus as described in the above "Background" portion of the present application.
Figure 2:
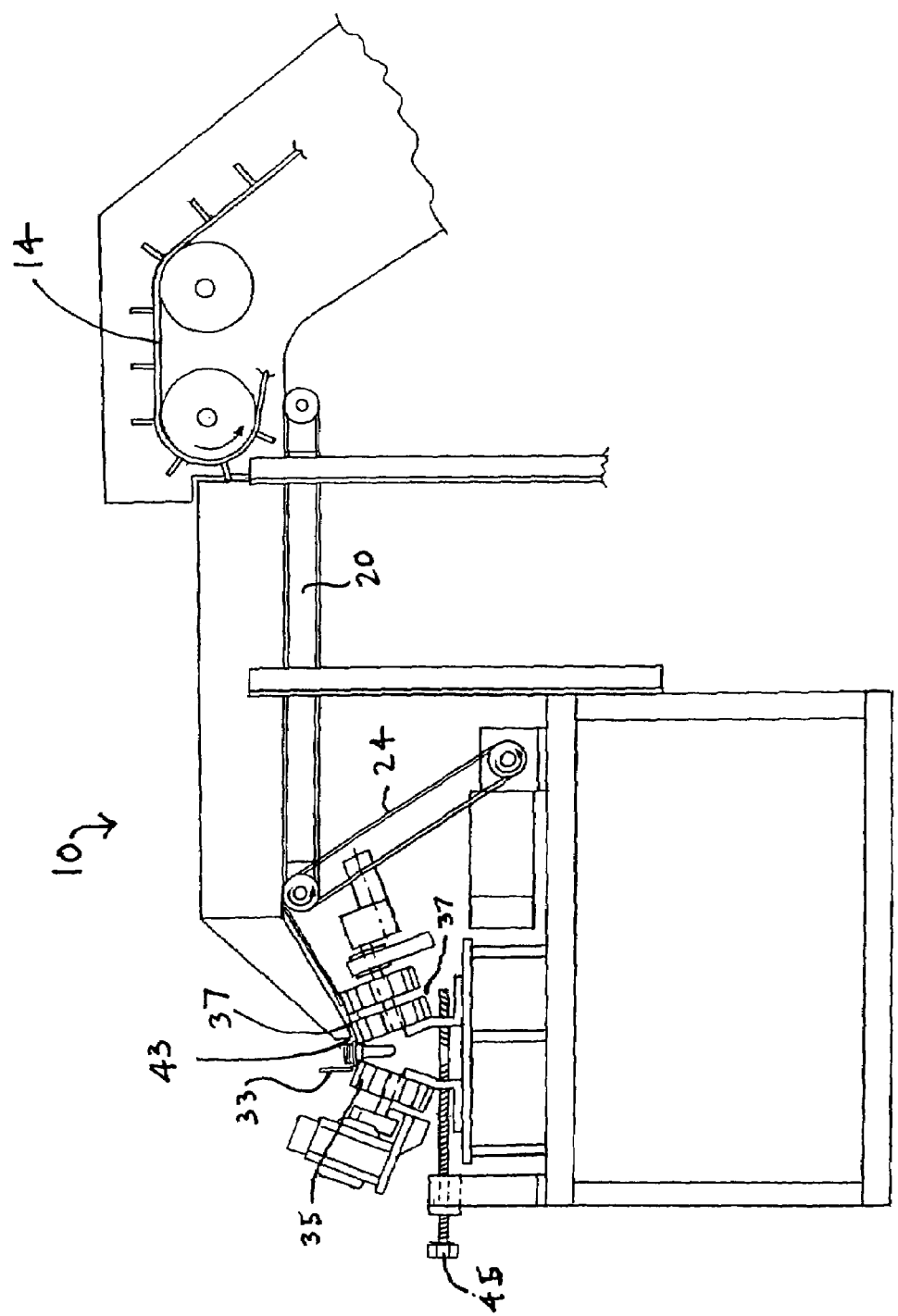
FIG. 2 is an end view of the prior art apparatus of FIG. 1.
Figure 3:
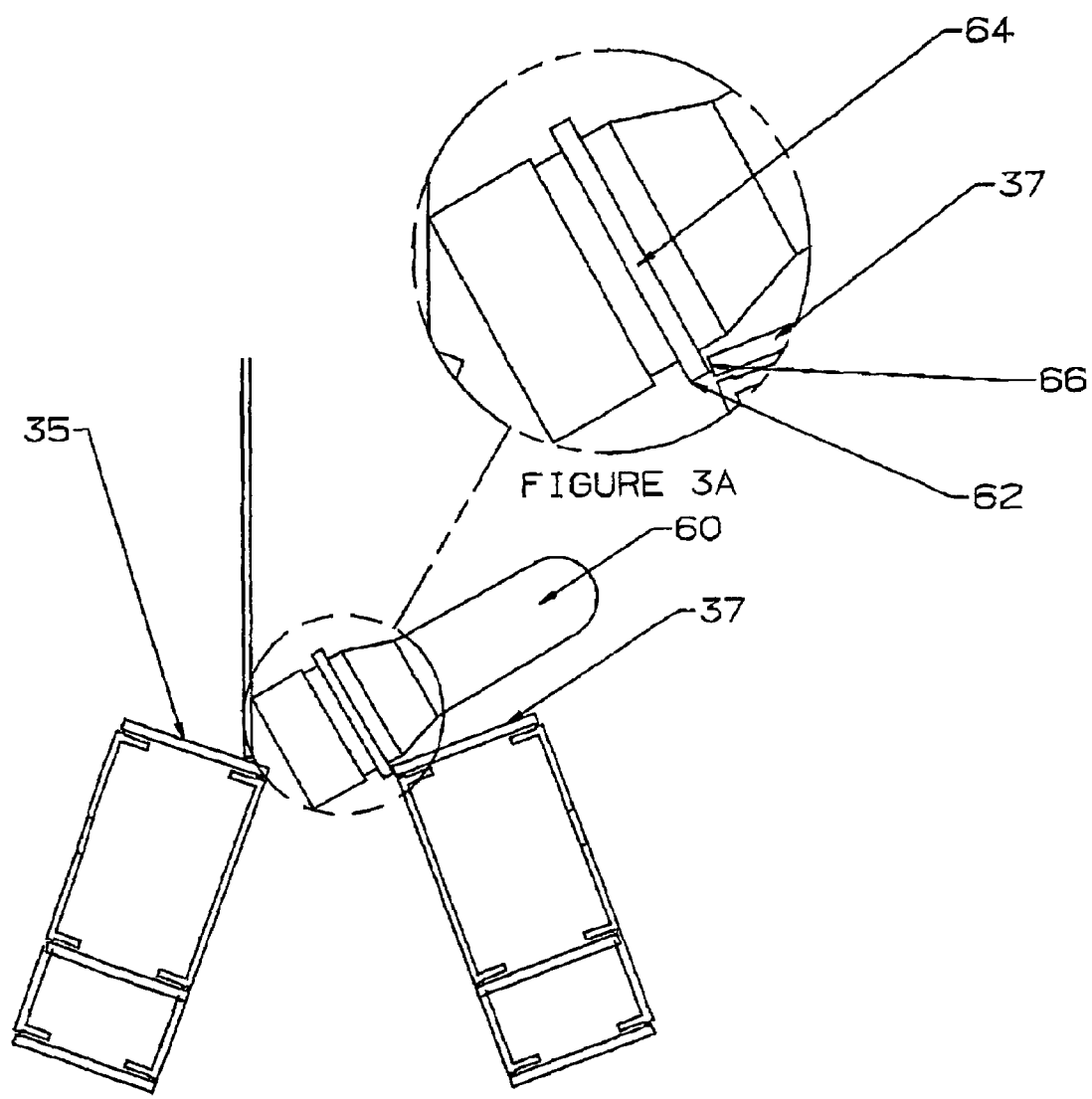
FIG. 3 is a schematic end view of a preform which has become frictionally locked in the prior art apparatus, in a manner discussed in the foregoing.
Figure 6:
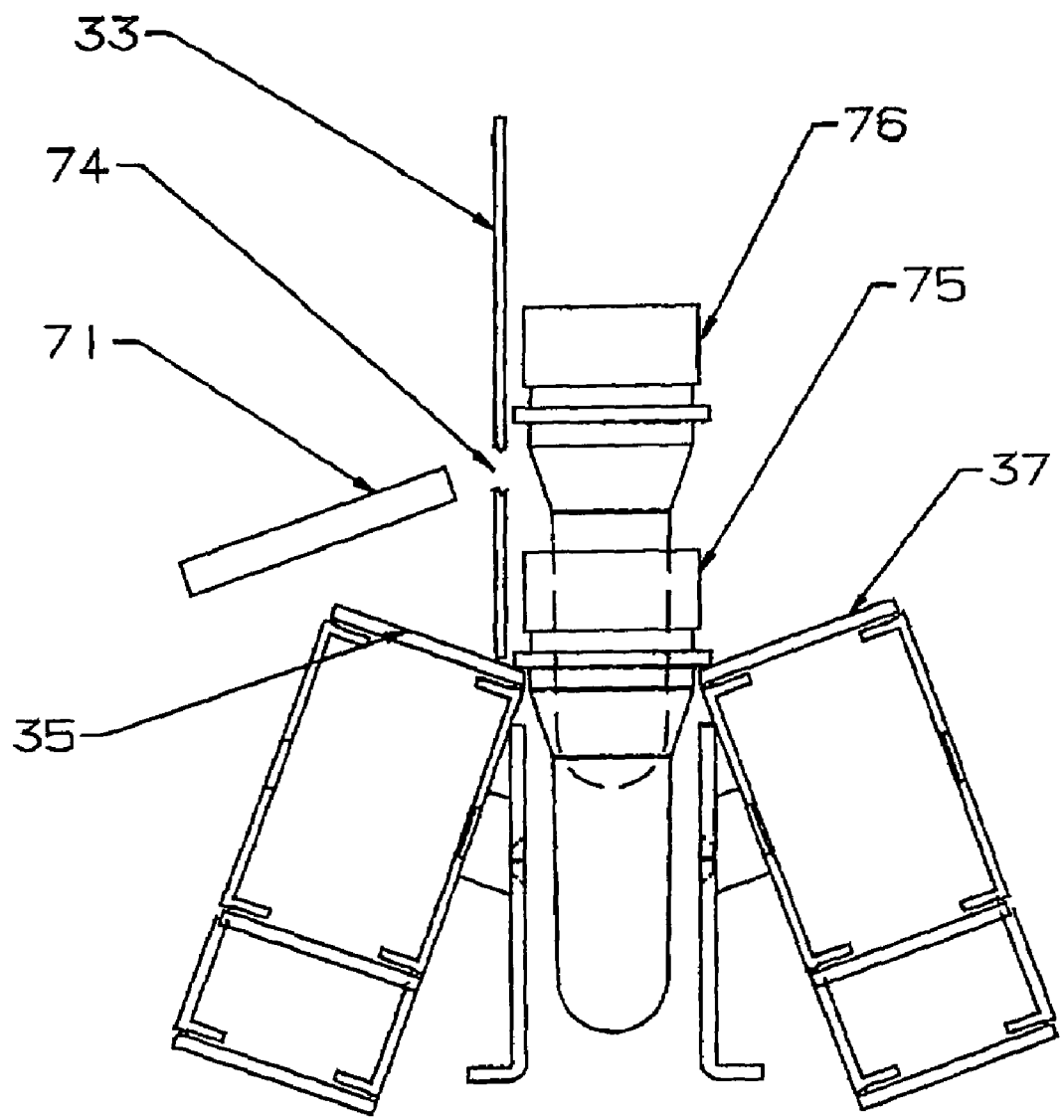
FIG. 6 is a view similar to FIG. 4, but showing how a preform may become properly seated in the gap between conveying belts, and also showing a blow-out nozzle positioned to remove improperly seated preforms.
Figure 6A:
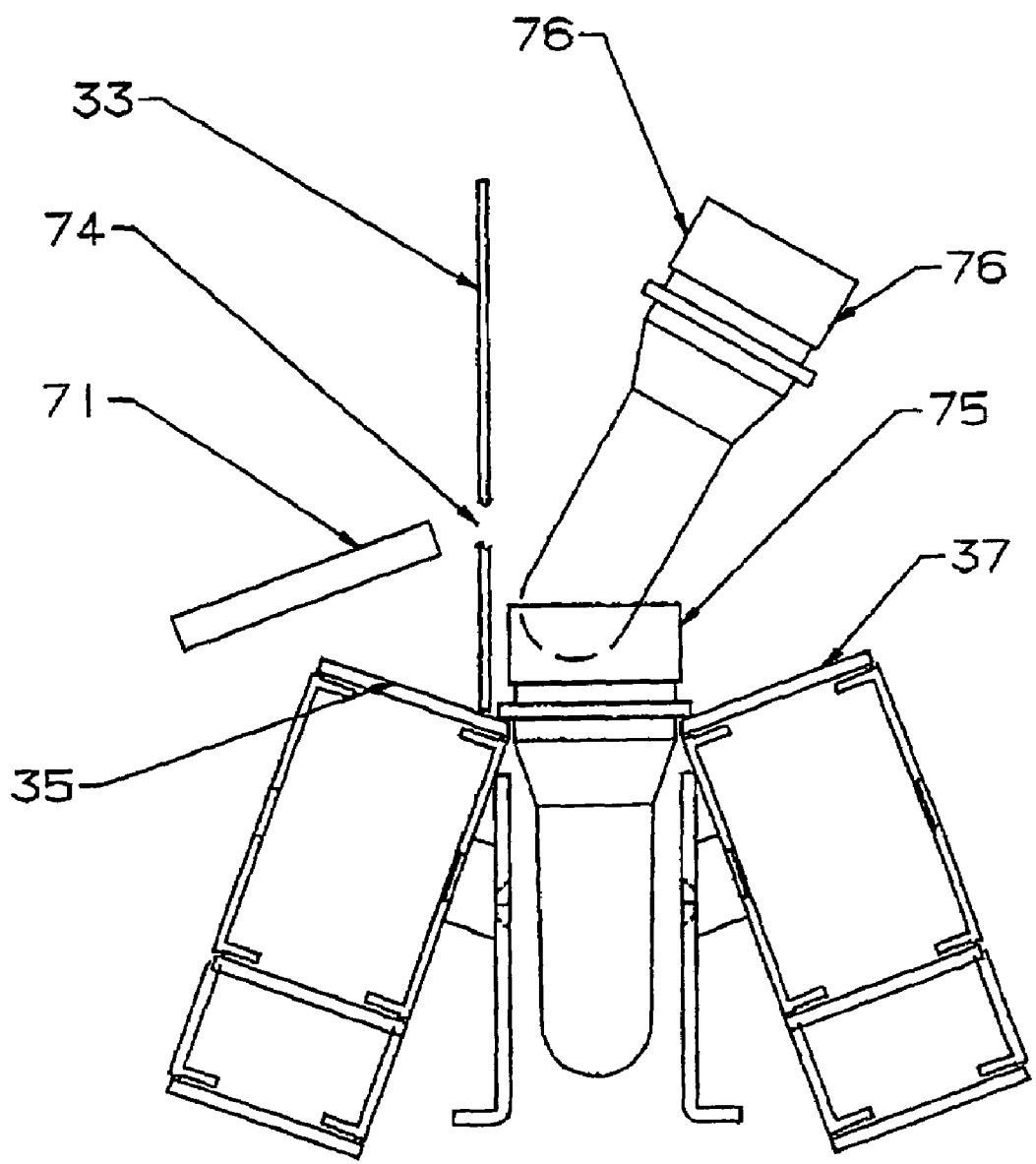
FIG. 6A is a view similar to FIG. 6, but showing an improperly seated preform being blown from the line of conveyance by the blow-out nozzle.

FIGS. 6 and 6A are illustrative of a further feature of the invention, viz. an improved deflection means. FIG. 6 shows a preform 75, which is properly seated, and advancing in the gap between belts 35 and 37. A further preform 76 which did not properly seat is shown in the course of being deflected by an air stream from bow-out nozzle 71. This nozzle 71 directs the air stream through an opening 74 in guide wall 33 (FIGS. 1 and 2) at a point near the output end of the apparatus where the deflection is to be accomplished. FIG. 6A shows the blow-out preform 76 as it continues to deflect from the conveying line.

While the present invention has been set forth in terms of specific embodiments thereof, it will be understood in view of the present disclosure that numerous variations upon the invention are now enabled to those skilled in the art, which variations yet reside within the present teachings. Accordingly, the invention is to be broadly construed and limited only by the scope and spirit of the claims now appended hereto.

The invention claimed is:

1. In apparatus for orienting and feeding blow molded preforms which are elongated generally cylindrical plastic objects, one end of which is a threaded neck portion for the ultimate blow molded container, and the other end of which extends from the opposed end of the cylindrical object as a narrower and heavier tubular portion which during the blow molding operation will be softened and enlarged into the ultimate container, the preform further including an encircling handling disc between the said threaded neck portion and tubular portion which has a larger diameter than the remaining portions of the perform, the said disc serving to facilitate handling of the preforms, said apparatus including:

(a) first and second continuous conveying belts having input and output ends for cooperatively conveying said objects toward a processing line;

(b) means for moving said belts in a common direction;

(c) said belts being mounted so that the respective conveying surfaces move in a common parallel direction; the lateral facing edges of said belts being spaced from one another to define a uniform gap therebetween of a dimension greater than the transverse diameter of said tubular portion and less than the transverse diameter of said enlarged disc portion of said preforms;

(d) said conveying surfaces residing and moving in respective planes which are upwardly sloped away from said gap, said surfaces thereby defining a zone converging downwardly in the direction of said gap;

(e) object input means for depositing said preforms at said input end of said moving belts;

(f) means for moving said belts at different respective speeds, whereby the elongated preforms from said input end are rotated by contact with the differentially speeding belts, permitting the heavier tubular portion to descend in said converging zone and slip into said gap and point vertically downward while the preform is supported at the gap and conveyed by the enlarged disc portion riding on the edges of the moving belts which border the said gap;

(g) means at the output ends of said belts for deflecting out of the line any preforms which are not properly oriented and seated in the said gap; and (h) preform output means at said output end of said belts for receiving the oriented preforms and directing them toward said processing line;

the improvement which precludes or minimizes the said preforms resisting deflection during said step (g) due to frictional lock between the said disc portion of the preform and an adjacent lateral edge of a said opposed belt, comprising: the lateral edge of the said belt abounding the said gap in the direction of deflection being formed to diverge upwardly away from the belt gap.

2. Apparatus in accordance with claim 1, wherein the lateral edges of both belts abounding the said gap are formed to diverge upwardly away from the belt gap.

3. Apparatus in accordance with claim 1, wherein the said lateral edge is formed as a straight sloping surface.

4. Apparatus in accordance with claim 1, wherein the said lateral edge is formed as a curved surface.

5. Apparatus in accordance with claim 1, wherein the said deflecting means comprises blowing means for blowing the improperly seated preforms out of the said line.

6. Apparatus in accordance with claim 1, wherein said preform input means includes an preform conveyer belt, a feed hopper, and means to move said preforms from said hopper to said conveyer belt and deposit the preforms thereon as substantially a single layer of preforms for feeding to said moving belts as a collection of substantially mutually spaced preforms.

7. Apparatus in accordance with claim 1, wherein said conveying belts are flattened closed loops, said conveying surfaces being defined at the uppermost sides of said loops.

8. Apparatus in accordance with claim 1, wherein said processing line is a blow molding line.

9. Apparatus in accordance with claim 1, wherein said means for moving said belts at different speeds enables a differential speed in the range of 110 to 180%.

10. Apparatus in accordance with claim 9, wherein said means for moving said belts at different speeds enables a differential speed in the range of 140 to 160%.

11. Apparatus in accordance with claim 1, further including vertical side walls mounted to extend downwardly at each side of said gap, to stabilize the seated preforms as they are conveyed by the said moving belts.

* * * * *